April 9, 1935. F. KILLIAN 1,997,367

PRIMARY BATTERY

Filed May 29, 1933

Inventor

Franz Killian

By Clarence A. O'Brien

Attorney

Patented Apr. 9, 1935

1,997,367

UNITED STATES PATENT OFFICE 1,997,367

PRIMARY BATTERY

Franz Killian, Hoboken, N. J.

Application May 29, 1933, Serial No. 673,563

1 Claim. (Cl. 136—107)

The main object of this invention is the provision of an improvement in dry cells whereby the effective electrical life of such cells is substantially increased, experiments and tests demonstrating that the life is extended by as much as thirty-five to forty percent.

Another object of the invention is the provision of a layer of chemically pure zinc metal powder at the base of the cell between the bottom of the can and the cardboard bottom washer after having first lined the bottom of the can and the lower surface of the bottom washer with a coating of excitant jelly or electrolyte.

The above and other objects will become apparent in the description below, in which characters of reference refer to like-named parts in the drawing.

Referring briefly to the drawing, Figure 1 is a vertical section through so-called No. 6 dry cell, showing the improvement embodied in the present invention.

Figure 1:
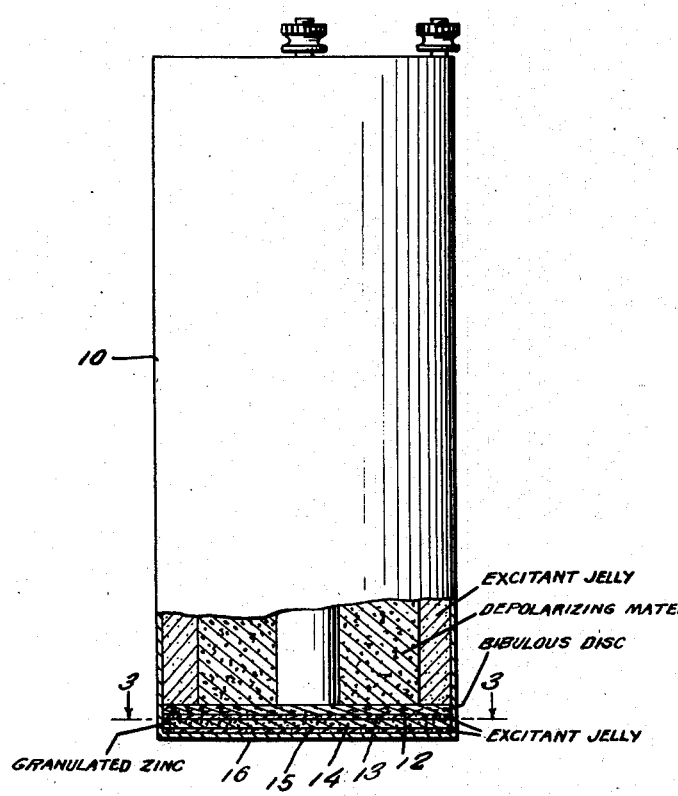
Figure 2:
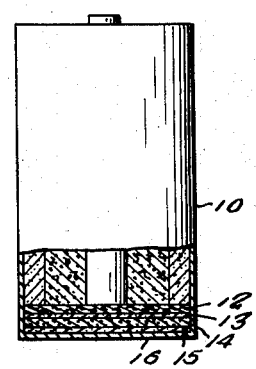
Figure 2 is a similar view, showing the improvement applied to a flashlight dry cell.
Figure 3:
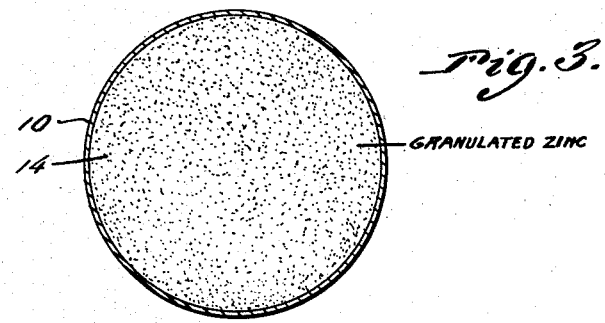
Figure 3 is a cross-sectional view taken on the line 3—3 of Figure 2.

Referring briefly to the drawing, the numeral 10 represents a No. 6 dry cell, and the numeral 11 a flashlight dry cell. Vertically downward to the cardboard bottom washer or disk 12, the construction of the cells is standard. The lower surface of the washer 12 is coated with electrolytic excitant jelly 13. The bottom 16 of the can 10 and 11 is also coated with excitant jelly 15. The space between these two parts is filled with a layer of chemically pure powdered zinc 14.

Experiments have proved conclusively that the addition of the powdered zinc layer 14 after the bottom of the washer 12 and the bottom 16 of the can have been coated with excitant jelly, increased the intermittent service life of the flashlight sack cells by a minimum of thirty-five percent. The standard 1¼ inch by 2¼ inch flashlight cells experimented with gave an intermittent service of from 17 to 20 hours. The same cells, after adding the improvement embodied in this invention, gave an intermittent service of from 24 to 27 hours. Similar results were obtained in experiments with the better type of flashlight cells, that is, those not enveloped in a sack of woven material.

Identical experiments with No. 6 type dry cells, both with and without the sacks, proved that the addition of the improvement of this invention extended the life of the cells by an average of forty percent.

The zinc metal powder may be added in small packages of very thin tissue paper which is readily soluble in the excitant jelly, or it may be added plain without a wrapper. The additional cost per unit cell is insignificantly small.

Experiments were also performed by using a solid zinc disk in place of the powdered zinc, and the results showed some extension of the life of the cell, but not nearly equal to that obtained with the powdered zinc. Examination of the solid zinc discs after completion of the experiments with the same, showed that the discs were very slightly attacked after the cells were dead. It appears that the powdered zinc is much more readily and thoroughly attacked. It was also noted that, with the powdered zinc, the cell recovered more rapidly after turning off the current, than in the case of the standard cells or those provided with the solid zinc disc.

Having thus described the invention and set forth the advantages presented thereby, what is claimed is as follows.

I claim:

In a dry cell, a zinc cup anode, a cathode contained within said cup, a bibulous disk disposed at the bottom of the cathode and conformable with the walls of the anode, spaced layers of excitant jelly one adhering to the bottom of the bibulous disk and the other adhering to the bottom of the zinc cup, and a layer of granulated zinc filling the space between and contacting with the layers of the excitant jelly.

FRANZ KILLIAN.